United States Patent [19]

Blount

[11] 4,377,646

[45] Mar. 22, 1983

[54] PROCESS FOR THE PRODUCTION OF FOAMED POLY(EPOXY-POLYISOCYANATE)SILICATE POLYMERS

[76] Inventor: David H. Blount, 5450 Lea St., San Diego, Calif. 92105

[21] Appl. No.: 405,414

[22] Filed: Aug. 5, 1982

Related U.S. Application Data

[63] Continuation-in-part of Ser. No. 326,842, Dec. 3, 1981, Pat. No. 4,357,463, which is a continuation-in-part of Ser. No. 122,015, Feb. 19, 1980, which is a continuation-in-part of Ser. No. 10,061, Feb. 7, 1979, Pat. No. 4,200,697, which is a continuation-in-part of Ser. No. 794,915, May 9, 1977, Pat. No. 4,125,498, which is a continuation-in-part of Ser. No. 653,727, Jan. 30, 1976, abandoned, which is a continuation-in-part of Ser. No. 562,201, Apr. 14, 1975, abandoned.

[51] Int. Cl.$^3$ ............................................. C08G 63/00
[52] U.S. Cl. ........................................ 521/154; 521/122; 521/156; 528/51; 528/56; 528/57; 528/73
[58] Field of Search ..................... 521/122, 154, 156; 528/51, 56, 57, 73, 510

[56] References Cited

U.S. PATENT DOCUMENTS

| | | | |
|---|---|---|---|
| 4,200,697 | 4/1980 | Blount | 521/83 |
| 4,211,848 | 7/1980 | Blount | 521/154 |
| 4,357,463 | 11/1982 | Blount | 528/366 |

*Primary Examiner*—Morton Foelak

[57] ABSTRACT

Poly(epoxy-polyisocyanate) silicate foamed products are produced by mixing and reactng an epoxide compound, an oxidated silicon compound and a polyisocyanate in the presence of a Lewis acid. The foam produced by this process may be utilized for thermal and sound insulation.

20 Claims, No Drawings

4,377,646

PROCESS FOR THE PRODUCTION OF FOAMED POLY(EPOXY-POLYISOCYANATE)SILICATE POLYMERS

CROSS-REFERENCE TO RELATED CO-PENDING APPLICATIONS

This application is a continuation-in-part of U.S. patent application, Ser. No. 326,842, filed Dec. 3, 1981, now U.S. Pat. No. 4,357,463, which is a continuation-in-part of U.S. patent application, Ser. No. 122,015, filed Feb. 19, 1980, which is a continuation-in-part of U.S. patent application, Ser. No. 10,061, filed Feb. 7, 1979, now U.S. Pat. No. 4,200,697, which is a continuation-in-part of U.S. patent application, Ser. No. 794,915, filed on May 9, 1977, now U.S. Pat. No. 4,125,498, which is a continuation-in-part of U.S. patent application, Ser. No. 653,727, filed Jan. 30, 1976, now abandoned, which is a continuation-in-part of U.S. patent application, Ser. No. 562,201, filed on Apr. 14, 1975, now abandoned.

BACKGROUND OF THE INVENTION

I have discovered that poly(epoxy-polyisocyanate) silicate foamed products are produced by mixing and reacting an epoxide compound, an oxidated silicon compound and a polyisocyanate in the presence of a Lewis acid. The epoxide compound, which does not contain a hydroxyl, and polyisocyanate when mixed produces a stable mixture and doesn't chemically react until a Lewis acid is added to the mixture.

Polyurethane silicate foams and resinous products and their preparation have been investigated intensively throughout the last few decades. It is well known in the arts that polyisocyanates will react with any organic compond that has a reactive hydrogen. The epoxide compounds utilized in this invention does not contain an active hydrogen that will react with an isocyanate radical without the presence of a catalyst. In the production of polyurethane products the organic epoxide compounds are utilized to produce polyhydroxyl compounds, then these compounds are reacted with a polyisocyanate to produce polyurethane products. In the arts it is known that an epoxy compound, an oxidated silicon compound, an amine compound and a polyisocyanate will react to produce a polyurethane-epoxy silicate resin as illustrated in U.S. Pat. No. 4,089,840 and an epoxy-polyurethane silicate foam as illustrated in U.S. Pat. No. 4,235,767.

A liquid epoxide-polyisocyanate-oxidated silicate mixture which can be foamed and cured rapidly at or near room temperatures by the addition of a Lewis acid would thus be a useful improvement in the foaming resin art. An additional improvement is brought about by utilizing an oxidated silicon compound and an oxidated phosphorus compound as the Lewis acid thereby producing a foamed product which is highly flame resistant and is self-extinguishing.

SUMMARY

I have found that a composition comprising a liquid epoxide compound, an oxidated silicon compound and a compound containing at least two isocyanate groups may be foamed and cured at about room temperature by admixing a Lewis acid into the composition. The foaming process will take place without the addition of a blowing agent. The poly(epoxy-polyisocyanate-silicate) polymer may also be produced in the form of a liquid poly(epoxy-polyisocyanate-silicate) prepolymer which contains active isocyanate radicals. The poly(epoxy-polyisocyanate-silicate) polymer may also be produced as a solid resin by letting the gas formed by the chemical reaction escape from the polymer before it is cured. The foam produced by the process of this invention may be flexible, semi-rigid, rigid or microporous solids.

The foamed products of this invention may be utilized as thermal and sound insulation, in packaging, as construction panels or any other uses that polyurethane foam is utilized for. The foamed or solid products may be dissolved in solvents and utilized as coating agents for wood, metal or plastics or as an adhesive agent.

The object of the present invention is to provide a novel process of producing poly(epoxy-polyisocyanate-silicate) foamed, solid or liquid products. Another object is to provide an improved method of producing polyurethane silicate foam wherein the components to be foamed can be premixed then reacted by the addition of a catalyst. Still another object is to produce an improved flame resistant cellular solid product by utilization of phosphoric acid as the catalytic component and also is incorporated into the foamed product. Another object of this invention is to produce self-extinguishing cellular solid products by utilizing a halogenated epoxide which does not contain any reactive hydrogen that will react with an isocyanate radical, a compound which contains at least two reactive isocyanate groups, an oxidated silicon compound and a catalyst, phosphoric acid, as the Lewis acid. Another object is to produce cellular solid products that may be used for thermal or sound insulation, structural purposes, shock-resistant packaging, cushions, coating for wood, metal and plastics, adhesives, coating material, putty, etc.

DETAILED DESCRIPTION

Poly(epoxy-polyisocyanate-silicate) foamed products may be produced by mixing and reacting the following components:
(a) an organic epoxide compound in the amount of 1 to 200 parts by weight;
(b) an organic compound containing 2 or more isocyanate radicals, in the amount of 50 parts by weight;
(c) a Lewis acid, in the amount of up to 20% by weight, percentage based on weight of components (a) and (b).
(d) an oxidated silicon compound in the amount of 1 to 50 parts by weight.

Component (a)

Any suitable organic epoxide compound which does not contain an active hydrogen that will react with isocyanate compound may be used in this invention. Suitable organic epoxide compounds include, but are not limited to, olifin oxides such as ethylene oxide, propylene oxide, butylene oxide, trichlorobutylene oxide, etc., styrene oxide, tetrahydrofuran, epihalohydrin such as epichlorohydrin, epibromohydrin, methyl epichlorohydrin, di-epi-iodohydrin, etc., polyepoxy which may be aliphatic or cycloaliphatic and monomeric or polymeric such as vinyl cyclohexane dioxide, 4,4-epoxycyclohexylmethyl-3,4-epoxy cyclohexane carboxylate, 3,4-epoxy-6-methylcyclohexylmethyl adipate, epoxidized vegetable oils, e.g., epoxidized soy bean oil, and the bis-epoxides of poly alkylene ether glycols, and mixtures thereof. It is preferred to use a mono-epoxide compound with the polyepoxy compound. Propylene oxide is the preferred epoxide compound.

Component (b)

Any suitable compound containing at least two isocyanate groups may be used in this invention.

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

$$O=C=N-R-N=C=O$$

wherein R is a divalent organic radical such as an alkylene, aralkylene or arylene radical. Such suitable radicals may contain, for example, 2 to 20 carbon atoms. Examples of such diisocyanates are:
tolylene diisocyante,
p,p'-diphenylmethane diisocyante,
phenylene diisocyanate,
m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate, and
ethylene diisocyanate.

Other polyisocyanates, polyisothiocyanates and their derivatives may be equally employed. Fatty diisocyanates are also suitable and have the general formula:

$$\begin{array}{c} NCO \\ | \\ (CH_2)_z \\ | \\ CH_3(CH_2)_xCH(CH_2)_yNCO \end{array}$$

where x+y totals 6 to 22 and z is 0 to 2, e.g., isocyanastearyl isocyanate.

It is generally preferred to use commercially readily-available polyisocyanates, e.g., tolylene-2,4- and -2,6-diisocyanate and any mixtures of these isomers, commerically known as "TDI"; polyphenylpolymethyleneisocyanates obtained by aniline aldehyde or ketone condensation followed by phosgenation, commercially known as "crude MDI"; and modified polyisocyanate containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates or aniline or anilines alkyl-substitued on the nucleus with formaldehydes or ketones may be used in this invention. Solutions of distillation residues accumulating during the production of tolylene diisocyanates, diphenyl methane diisocyanates, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene-1,4-; and methylene-bis-(cyclohexyl-4,4'-) diisocyanate may be used in this invention. Suitable polyisocyanates which may be used according to the ivnention are described by W. Siefkin in Justus Liebigs Annalen der Chemie, 562, pages 75 to 136. Inorganic and silicon polyisocyanates are also suitable according to the invention.

Organic polyhydroxyl compounds (polyols) may be first reacted with a polyisocyanate to produce isocyanate-terminated polyurethane prepolymers and then used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and, preferably, from about 1,000 to 6,000, e.g., polyesters, polyethers, polythioethers, polyacetals, polycarbonates or polyester amides containing at least 2, generaly from 2 to 8, but, preferably, dihydric alcohols, with the optional addition of trihydric alcohols, and polybasic, preferably dibasic, carboxylic acids. Instead of the free polycarboxylic acids, the corresponding polycarboxylic acid anhydrides are corresponding polycarboxylic acid esters of lower alcohols or their mixtures may be used for preparing the polyesters. The polycarboxylic acid may be aliphatic, cycloaliphatic, aromatio and/or heterocyclic and may be substituted, e.g., with halogen atoms and may be unsaturated. Examples include: Succinic acid, adipic aicd, sebasic acid, suberic acid, azelaic acid, phthalic acid, phthalic acid anhydride, isophthalic acid, tetrahydrophthalic acid anhydride, trimetallitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used, such as, for example, ethylene glycol, propylene-1,2- and -1,3-glycol; butylene-1,4- and -2,3-glycol; hexane-1,6-diol; octane-1,8-diol; neopentyl glycol; cyclohexanedimethanol-(1,4-bishydroxymethylcyclohexane); 2-methyl-propane-1,3-dio; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetra ethylene glycol; polyethylene glycols; dipropylene glycol; polypropylene glycols; dibutylene glycol and polybutylene glycols. The polyesters may also contain a proportion of carboxyl end groups. Polyesters of lactones such as c-caprolactone, or hydroxycarboxylic acid such as c-hydroxycaproic acid may also be used.

The polyethers with at least 2, generally from 2 to 8, and, preferably, 2 to 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$ or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane; aniline; ammonia, ethanolamine or ethylenediamine; sucrose polyethers, such as those described in German Auslegeschrifren Nos. 1,176,358 and 1,064,938, may also be used according to the invention. It is frequently preferred to use polyethers which contain, predominantly, primarily OH groups (up to 90% by weight, based on the total OH groups contained in the polyether). Polyethers modified with vinyl polymers such as those which may be obtained by polymerizing styrene or acrylonitrites in the presence of polyethers (U.S. Pat. Nos. 3,383,351; 3,304,273; 3,523,093 and 3,110,695; and German Patent No. 1,152,536) and polybutadienes which contain OH groups are also suitable.

By "polythioethers" are meant, in particular, the condensation products by thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4'-dihydroxydiphenylmethylmethane, hexanediol and formaldehyde. Polyacetals suitable for the invention may also be prepared by the polymerization of cyclic acetals.

The polycarbonates with hydroxyl groups may be of the kind, e.g., which may be prepared by reaction diols, e.g., butane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and piolyamides include, e.g., the predominantly linear condensates obtained from polyvalent saturated and unsaturated carboxylic acids or their anhydrides, any polyvalent saturated or unsaturated amino alcohols, diamines, polyamines and mixtures thereof.

Polyhydroxyl componds which contain urethane or urea groups, modified or unmodified natural polyols, e.g., castor oil, wood particles, cellulose, modified cellulose, carbohydrates and starches, may also be used. Additional products of alkylene oxides with phenol formaldehyde resins or with urea-formaldehyde resins are also suitable for the purpose of the invention.

Organic hydroxyl silicate compound as produced in U.S. Pat. No. 4,139,549 may also be used in this invention to react with the polyisocyanates to form polyurethane silicate prepolymers.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch Volume VII, Vieweg-Hochtlen, Carl-Hanser-Verlag, Munich, 1966, on pages 45 to 71.

Component (c)

Any suitable Lewis acid may be used in this invention. A Lewis acid is any electronacceptor relative to other reagents present in the system. A Lewis acid will tend to accept a pair of electrons furnished by an electron donor (or Lewis base) in the process of forming a chemical compound. A "Lewis acid" is defined for the purpose of this invention as any electron-accepting material relative to the polymer to which it is complexed. Phosphoric acid is the preferred Lewis acid.

Typical Lewis acids are:
quinones, such as:
p-benzo-quinone,
2,5-dichlorobenzoquinone,
2,6-dichlorobenzoquinone,
chloranil,
naphthoquinone-(1,4),
anthraquinone,
2-methylanthraquinone,
1,4-dimethylanthraquinone,
1,chloroanthraquinone,
anthraquinone-2-carboxylic acid,
1,5-dichloroanthraquinone,
1-chloro-4-nitroanthraquinone,
penanthrene-quinone,
acenaphenequinone,
pyranthrenequinone,
chrysenequinone,
thio-naphthene-quinone,
anthraquinone-1,8-disulfonic acid and anthraquinone-2-aldehyde;

triphthaloylbenzene-aldehydes such as:
bromal,
4-nitrobenzaldehyde,
2,6-dichlorobenzaldehyde-2,
ethoxyl-1-naphthalidehyde,
anthracene-9-aldehyde,
pyrene-3-aldehyde,
oxindole-3-aldehyde,
pyridine-2,6-dialdehyde,
biphenyl-4-aldehyde;

organic phosphonic acids such as:
4-chloro-2-nitrobenzene-phosphonic acid nitrophenols, such as 4-nitrophenol,
picric acid;

acid anhydrides, for example:
acetic-anhydride,
succinic anhydride,
maleic anhydride,
phthalic anhydride
tetrachlorophthalic anhydride,
perlene-3,4,9,10-tetracarboxylic acid and
chrysene-2,3-8,9-tetracarboxylic anhydride,
di-bromo maleic acid anhydride;

metal halides of the metals and metalloids of the groups 1B, II through to group VIII of the periodical system, for example:
aluminum chloride,
zinc chloride,
ferric chloride,
tin tetrachloride,
(stannic chloride),
arsenic trichloride,
stannous chloride,
antimony pentachloride,
magnesium chloride,
magnesium bromide,
calcium bromide,
calcium iodide,
strontium bromide,
chromic bromide, manganous chloride,
cobaltous chloride,
cobaltic chloride,
cupric bromide,
ceric chloride,
thorium chloride,
arsenic tri-iodide;

boron halide compounds, for example:
boron trifluoride,
boron trichloride;

ketones, such as:
acetophenone,
benzophenone,
2-acetylnaphthalene,
benzil,
benzoin,
5-benzoylacenaphthene,
biacene-dione,
9-acetyl-anthracene,
9-benzoyl-anthracene,
4-(4-dimethyl-amino-cinnamoyl)-1-acetylbenzene,
acetoacetic acid anilide,
indandione-(1,3),
(1,3-diketohydrindene),
acenaphthene quinone-dichloride,
anisil,
2,2-puridil and
furil.

Additional Lewis acids are mineral acids such as:
the hydrogen halides,
sulphuric acid and
phosphoric acids;

organic carboxylic acids, such as:
acetic acid and the substitution products thereof,
monochloro-acetic acid,
dichloroacetic acid,
trichloroacetic acid,
phenylacetic acid,
7-methylcoumarinylacetic acid (4),
maleic acid,
cinnamic acid,
benzoic acid,
1-(4-diethyl-amino-benzoyl)-benzene-2-carboxylic acid,
phthalic acid,
and tetra-chlorophthalic acid,
alpha-beta-dibromo-beta-formyl-acrylic acid (mucobromic acid),
dibromo-maleic acid,
2-bromo-benzoic acid,
gallic acid,
3-nitro-2-hydroxy-1-benzoic acid,
2-nitro-benzoic acid,
3-nitro-benzoic acid,
4-nitro-benzoic acid,
2-chloro-4-nitro-1-benzoic acid,
3-nitro-4-methoxy-benzoic acid,
4-nitro-1-methyl-benzoic acid,
2-chloro-5-nitro-1-benzoic acid,
3-chloro-6-nitro-1-benzoic acid,
4-chloro-3-nitro-1-benzoic acid,
5-chloro-3-nitro-2-hydroxybenzoic acid,
4-chloro-1-hydroxy-benzoic acid,
2,4-dinitro-1-benzoic acid,
2-bromo-5-nitro benzoic acid,
4-chlorophenyl-acetic acid,
2-chloro-cinnamic acid,
2-cyana-cinnamic acid,
2,4-dichlorobenzoic acid,
3,5-dinitro-benzoic acid,
3,5-nitro-salycylic acid,
malonic acid,
mucic acid,
acetosalycylic acid,
benzilic acid,
butane-tetra-carboxylic acid,
citric acid,
cyano-acetic acid,
cyclo-hexane-dicarboxylic acid,
cyclo-hexane-carboxylic acid,
1,10-dichlorostearic acid,
fumaric acid,
itaconic acid,
levulinic acid,
(levulic acid),
malic acid,
succinic acid,
alpha-bromo stearic acid,
citraconic acid,
dibromo-succinic acid,
pyrene-2,3,7,8-tetra-carboxylic acid,
tartaric acid;

organic sulphonic acids, such as:
4-toluene sulphonic acid, and
benzene sulphonic acid,
2,4-dinitro-1-methyl-benzene-6-sulphonic acid,
2,6-dinitro-1-hydroxy-benzene-4-sulphonic acid,
2-nitro-1-hydroxy-benzene-4-sulphonic acid,
4-nitro-1-hydroxy-2-benzene-sulphonic acid,
3-nitro-2-methyl-1-hydroxy-benzene-5-sulphonic acid,
6-nitro-4-methyl-1-hydroxy-benzene-2-sulphonic acid,
4-chloro-1-hydroxy-benzene-3-sulphonic acid,
2-chloro-3-nitro-1-methyl-benzene-5-sulponic acid and
2-chloro-1-methyl-benzene-4-sulphonic acid.

Component (d)

Any suitable oxidated silicon compound may be used in this invention. Suitable oxidated silicon compounds include, but are not limited to, silicic acid, polysilicic acid, hydrated silica, silicoformic acid, polysilicoformic acid, natural silicates containing free silicic acid radicals and mixtures thereof.

Alkali metal silicate and alkaline earth metal silicates may be used with Lewis acids that will react with the alkali radicals to produce free silicic acid radicals.

Polysilicic acid is the preferred oxidated silicon compound and in the form of fine particles or powder. An excess amount of the oxidated silicon compound may be used in this invention as a filler.

The preferred process to produce foamed poly(epoxy-polyisocyanate-silicate) products is to simultaneously mix 1 to 200 parts by weight of monoepoxide compound (component a) 50 to 100 parts by weight of an organic compound containing at least 2 isocyanate groups (component b), up to 20% by weight of a Lewis acid (component c) and 1 to 50 parts by weight of an oxidated silicon compound, (component d), percentage based on weight of components (a) and (b), at a temperature and pressure wherein the components are in a liquid state.

The components (a), (b), (c) and (d) may be mixed in any suitable manner. Components (a) and (b) may be pre-mixed, then component (c) and (d) added when desired.

The chemical reactions of this invention may take place at any suitable physical conditions. Ambient temperature and pressure is usually used except when one of the components is a gas, then an increase in pressure is desirable. The chemical reaction is exothermic and in some chemical reactions it is desirable to cool the reaction mixture.

The reaction of components (a) and (b) in the presence of Lewis may be stopped by the addition of a compound which will react with the Lewis acid thereby stopping the catalytic action of the Lewis acid. The chemical reaction may be stopped while the mixture is still in a fluid state and the gas bubbles escape. Suitable compounds which will react with the Lewis acid include alkali compounds such as, but not limited to, alkali metal carbonates, alkaline earth metal carbonates, alkali metal hydroxide, alkaline earth carbonates, alkali metal silicates, alkaline metal earth silicates and mixtures thereof which are added in an amount wherein the alkali radicals are about equal to the Lewis acid radicals. The alkali compounds are added in an amount wherein the alkali radicals are about equal to the Lewis acid radicals. The reacted components (a), (b), (c) and (d) which has been stopped while still in a fluid state, may be cured by a curing agent for isocyanate such as water or a curing agent for epoxy resins depending whether they are unreacted epoxy radicals or isocyanate radicals. Amine compounds will cure both the epoxy and isocyanate radical. Lewis acids will catalyze the fluid poly(epoxy-polyisocyanate-silicate) prepolymer to be foamed and solidified.

When the preferred Lewis acid, phosphoric acid, is utilized in the reaction of this invention more than a catalytic amount may be utilized. The phosphoric acid reacts with the epoxide compound and becomes a part of the poly(epoxy-polyisocyanate-silicate) polymer. This addition of phosphoric acid greatly improves the flame resistant properties of this foam. Any suitable oxidized phosphorous compound which has Lewis acid activity may be utilized in this invention. The monoalkali metal hydrogen phosphate may also be utilized as the Lewis acid. The alkali metal hydrogen sulfate may also be used as the Lewis acid. When a halogenated epoxy compound such as trichlorobutylene oxide or epichlorohydrin is utilized as the epoxide compound and phosphoric acid as the Lewis acid, a foamed poly(epoxy-polyisocyanate-silicate) polymer will not support a flame and is self-extinguishing.

Inorganic polyisocyanates and isocyanate-terminated polyurethane silicate prepolymers may also be used in this invention. The compound containing at least two isocyanate groups may be modified with 0.2 to 25 mol. %, based on the weight of the polyisocyanate compound, of a compound which contains at least one active hydrogen either before, or after the reaction in the invention.

Polyisocyanate curing agents and/or polyisocyanate activators (catalysts) may be used in the process of producing polyurethane foamed products and are added after the foaming has started, but while still in a fluid state. The following are examples of polyisocyanate curing agents and activators:

1. Water.
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates may also be used. The molar ratio of alkali metal oxide to $SiO_2$ is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commerical dry granular sodium and potassium silicates. Heating may be required to start the curing reaction.
6. Water containing 20% to 70% by weight of silica sol.
7. Activators (catalysts) which act as curing agents and are added to the polyurethane or polyurethane prepolymer in the amount of 0.001% to 10% by weight. They may be added in water. (a) Tertiary amines, e.g., triethylamine; tributylamine; N-methyl-morpholine; N,N,N',N'-tetramethylenediamine; 1,4-diazobicyclo-(2,2,2)-octane; N-methyl-N'-dimethylaminoethyl piperazine; N,N-dimethylbenzylamine; bis (N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine; and 1,2-dimethylimidazole. Suitable tertiary amine activators which contain hydrogen atoms which are reactive with isocyanate groups include, e.g., triethanolamine; triisopanolamine; N,N-dimethyl-ethanolamine; N-methyldiethanolamine; N-ethyldiethanolamine; and their reactive products with alkylene oxides, e.g., propylene oxide and/or ethylene oxide and mixtures thereof.
   (b) Organo-metallic compounds, preferably organo-tin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.
   (c) Silaamines with carbon-silicon bonds are described, e.g., in British Pat. No. 1,090,589, may also be used as activators, e.g., 2,2,4-trimethyl-1,2-silamorpholine or 1,3-diethylaminoethyl-tetramethyldisiloxane.
   (d) Other examples of catalysts which may be used according to the invention, and details of their action are described in Kunststoff-Handbuch, Volume VII, published by Vieweg and Hochtlen, Carl-Hanser-Verlag, Munich, 1966, on pages 96 and 102.
8. Water containing 1% to 10% by weight of bases which contain nitrogen such as tetraalkyl ammonium hydroxides.
9. Water containing 1% to 10% by weight of alkali metal hydroxides such as sodium hydroxide; alkali metal phenolates such as sodium phenolate or alkali metal alcoholates such as sodium methylate.
10. Water containing sodium polysulfide in the amount of 1% to 10% by weight.
11. Water containing 20% to 70% by weight of a water-binding agent, being capable of absorbing water to form a solid or a gel, such as hydraulic cement, synthetic anhydrite, gypsum or burnt lime.
12. Water containing 10% to 50% ammonium or alkali metal borate.
13. Mixtures of the above-named curing agents.

Surface-active additives (emulsifiers and foam stabilizers) may also be used according to the invention. The emulsifiers should not contain an alkali metal salt because it may inactivate the Lewis acid.

The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308. These additives are, preferably, used in quantities of up to 20% based on the reaction mixture.

Negative polyisocyanate catalyst, for example, substances which are acidic in reaction, e.g., hydrochloric acid or organic acid halides act as a catalyst in this invention, known cell regulators, e.g., paraffins, fatty alcohols, silanes, polysiloxanes, polyether polysiloxanes and/or dimethyl polysiloxanes, pigments or dyes, known flame-retarding agents, e.g., trischloroethylphosphate or ammonium phosphate and polyphosphates, stabilizers against aging and weathering, plasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich, 1966, on pages 103 to 113. The halogenated paraffins and inorganic salts of phosphoric acid are the preferred fire-retarding agents.

Aqueous solutions of silicates may be prepared in the form of 25% to 70% silicates. Silica sols which may have an alkaline or acid pH may also be used in combination with aqueous silicate solutions. The choice of concentration depends mainly on the desired end product. Compact materials or materials with closed cells are, preferably, produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate, tris(2,3-dichloropropyl)-phosphate; polyoxypropylene-chloro-methylphosphonate; cresyldiphenylphosphate; tricresylphosphate; tris-(beta-chloro-ethyl)-phosphate; tris-2,3-dichloropropyl)-phosphate; triphenylphosphate; ammonium phosphate; perchlorinated diphenyl phosphate; perchlorinated terephenyl phosphate; hexabromocyclodecane; tribromophenol; dibromopropyldiene; hexabromobenzene; octabromodiphenylether; pentabromotoluol; polytribromostyrol; tris-(bromocresyl)-phosphate; tetrabromobis-phenol A; tetrabromophthalic acid anhydride; octabromodiphenyl phosphate; tri-(diabromopropyl)-phosphate; calcium hydrogen phosphate; sodium or potassium dihydrogen phosphate; disodium or dipotassium hydrogenphosphate; ammonium chloride, phosphoric acid; polyvinylchloride, tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane silicate products.

The ratios of the essential reactants and optional reactants which lead to the poly(epoxy-polyisocyanate-silicate) resinous or foamed product of this invention may vary, broadly speaking, with ranges as follows:

(a) 1 to 200 parts by weight of an organic epoxide compound;
(b) 50 to 100 parts by weight of a compound containing at least 2 isocyanate groups;
(c) up to 20% by weight of a Lewis acid, percentage based on weight of components (a) and (b);
(d) 1 to 50 parts by weight of an oxidated silicon compound;
(e) up to 50% by weight of a chemically inert blowing agent, boiling within the range of from 31 25° C. to 80° C.;
(f) up to 10% by weight of a polyisocyanate activator;
(g) up to 200% by weight of a curing agent;
(h) up to 20% by weight of an emulsifying agent;
(i) up to 20% by weight of a foam stabilizer.

In the cases where the viscosity of the polyisocyanate is too high, it may be reduced by adding a low-viscosity isocyanate, or even by adding inet solvents such as acetones, diethyl ether, ethyl acetate and the like.

In cases were the curing agent contains an aqueous alkali silicate, the isocyanate-terminated polyurethane prepolymer may be sulphonated. It is usually sufficient to react the isocyanate-terminated polyurethane prepolymer with concentrated sulphuric acid or oleum of sulfur trioxide in order to produce a sulphonated poly-(urethane silicate) prepolymer containing the sulphonic group in the amount of 3-100 milli-equivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester resinous products.

The sulphonated isocyanate-terminated polyurethane prepolymer can be directly mixed with an aqueous silicate solution, in which case the corresponding metal salt is formed in situ. The sulphonated polyurethane prepolymer may be completely or partly neutralized at the onset by the addition of amines, metal alcoholates, metal oxides, metal hydroxides or metal carbonates.

Water-binding components may be used in this invention, including organic or inorganic water-binding substances which have, first, the ability to chemically combine, preferably irreversibly, with water, and second, the ability to reinforce the poly(epoxy-polyisocyanate-silicate) plastics of the invention. The term "water-binding component" is used herein to identify a material, preferably granular or particulate, which is sufficiently anhydrous to be capable of absorbing water to form a solid or gel such as mortar or hydraulic cement.

A water-binding component such as hydraulic cement, synthetic anhydrides, gypsum or burnt lime may be added to any of the components to produce a tough, somewhat flexible solid or cellular solid concrete. The water-binding component may be in amounts from up to 200% by weight, based on the weight of the reactants. When a water-binding agent is added and when the curing agent is an aqueous alkali metal silicate solution, a halogenated or phosphorus-containing compound or mixture thereof may be added in the amount of 1% to 30% by weight, based on the weight of the reactants.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard produce by admixture of water, which combines chemically with the other ingredients to form a hydrate, may be used. There are many kinds of cement which can be used in the production of the compositions of the invention and they are so well known that a detailed description in Encyclopedia of Chemical Technology, Volume 4, Second Edition, published by Kirk-Othmer, pages 684 to 710, of the type of cement which may be used in the production of this invention and which are incorporated herein by reference.

Blowing agents which will not react with polyisocyanates may be used to improve or increase the foaming to produce cellular solid plastics such as acetone, ethyl acetate, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen such as azo compounds, azoisobutyric acid nitrile, may also act as blowing agents. Compressed air may act as a blowing agent. Other examples of blowing agents and details of the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportion of the components may be adjusted to a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 90% by weight, is desirable, such as when the final product is required to have mainly the properties of an inorganic silicate plastic, in particular, high-temperature resistance and complete flame resistance, an alkali metal silicate may be added with copolymer or polyol or be reacted with the polyisocyanate to produce a polyurethane prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening and reinforcing effect.

The properties of the foams (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 200 times their original volume.

The poly(epoxy-polyisocyanate-silicate) plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required in order to initiate foaming. The blowing agent may be added to the polyisocyanate, epoxide compound, oxidated silicon compound or Lewis acid.

Reinforcing elements may quite easily be incorporated into the reaction mixtures. The alkali compound used for fillers or reinforcing elements should be added after the reaction has started, but while the mixture is still fluid. The inorganic and/or organic reinforcing elements may be, e.g., fibers, metal wires, foams, fabrics, fleeces, or skeletons. The reinforcing elements may be mixed with the reaction mixtures, for example, by the fibrous web impregnation or by processing in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges, as catalyst carriers or as carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic articles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formaldehyde, phenolformaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered, metallized, coated, laminated, galvanized, vapor-treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high-dimensional stability to heat and flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cuttings and plants or cut flowers or dissolved in a solvent and used as a coating agent for wood, metals or plastics.

The foamed or solid concrete produced by this invention may be used as surface coatings having good adhesion and resistance-to-abrasion properties, as mortars, and for making molded products, particularly in construction engineering and civil engineering such as for building walls, igloos, boats and for roadbuilding, etc. These products are lightweight, thermal-insulating materials with excellent mechanical properties and fire resistance. The amount of water-binding component used varies greatly, depending on the type of product desired, up to 200% by weight, based on weight of reactants. In certain cases, it is desirable to add sand and gravel in the amount of 1 to 6 parts by weight of each part by weight of the hydraulic cement. The mixture may be poured in place, troweled on or sprayed onto the desired surface to produce a solid or cellular solid product.

Fillers in the form of powders, granules, wire, fibers, dumb-bell-shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, aluminosilicates, cements, basalt wool or powder, glass fibers, carbon fibers, graphite, carbon black, Al-, Fe-, Cr- and Ag-powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the reacted mixture of the Components (a), (b) and (c) in many applications. Among numerous organic polymers which may be used, e.g., as powders, granules, foam particles, beads, hollow beads, foamable (but not-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluorethylene, aliphatic and aromatic polyesters, malamine, urea, phenol resins, phenol silicate resins, polyacetal resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is preferably, filled with organic fillers. Fillers which are particularly preferred are chalk, talc, dolomite, gypsum, clay, anhydrite, glass, carbon and the conventional plastics and rubber waste. Fillers which will react with the Lewis acid should not be used until the components have reacted, but are still fluid.

In many cases, the poly(epoxy-polyisocyanate-silicate) resinous and foamed products produced by the invention are soluble in organic solvents and may be used as a tough coating agent for wood and metal. The mixtures of the invention are also suitable for use as impregnating agents for finishing fibers. The mixtures may also be extruded through dies or slots and be converted into fibers and foils. These fibers and foils may be used for producing synthetic incombustible paper or fleeces.

When the fluid poly(epoxy-polyisocyanate-silicate) polymer, produced by the process of the invention, are combined with expanded clay and an alkali metal silicate solution, a very good concrete is obtained which can, for example, be used as panels in the construction field. In this case, the foam material (expanded clay) plays the part of the binding material.

DESCRIPTION OF PREFERRED EMBODIMENTS

My invention will be illustrated in greater detail in the specific examples which follow which detail the preferred embodiments of my process. It should be understood that the scope of my invention is not limited to the specific processes set out in the Examples. Parts and percentages are by weight, unless otherwise indicated.

EXAMPLE 1

About 100 parts by weight of propylene oxide, 100 parts by weight of polyphenylpolymethylene-polyisocyanate containing about 31% NCO by weight, 10 parts by weight of concentrated phosphoric acid and 20 parts by weight of fine granular silicic acid, are thoroughly mixed, then in 5 to 20 seconds the mixture begins to expand. The mixture expands to 10 to 20 times its original volume within 15 to 60 seconds, then solidifies into a rigid foam.

EXAMPLE 2

About 100 parts by weight of epichlorohydrin, 50 parts by weight of tolylene diisocyanate, 10 parts by weight of powdered hydrated silica and 5 parts by weight of concentrated phosphoric acid are thoroughly mixed. The mixture begins to expand in 10 to 30 seconds and expands to 10 to 15 times its original volume, then within 30 to 120 seconds forms a tough rigid foam. This foam is highly resistant to flame and is self-extinguishing.

EXAMPLE 3

About 100 parts by weight of propylene oxide, 50 parts by weight of trichlorobutylene oxide, 100 parts by weight of polyphenylpolymethylenepolyisocyanate with an NCO content of about 31% by weight, 0.5 parts by weight of BF$_3$, 50 parts by weight of silica sol and 10 parts by weight of concentrated phosphoric acid are thoroughly mixed. The mixture begins to expand in 10 to 30 seconds and expands to 4 to 10 times its original volume, then within 1 to 3 minutes forms a very tough rigid foam. This foam is highly resistant to flame and is self-extinguishing.

EXAMPLE 4

About 100 parts by weight of propylene oxide, 100 parts by weight of polyphenylpolymethylene-polyisocyanate, 40 parts by weight of fine granular polysilicic acid and 3 parts by weight of mercury chloride are mixed. The mixture begins to expand in 30 to 120 seconds and slowly expands to 5 to 10 times its original volume within 2 to 10 minutes, thereby producing a rigid, foamed poly(epoxy-polyisocyanate-silicate) product.

EXAMPLE 5

About 100 parts by weight of tetrahydrofuran, 100 parts by weight of polyphenylpolymethylene-polyisocyanate, 10 parts by weight of concentrated phosphoric acid, 50 parts by weight of fine granular hydrated silica and 1 part by weight of a water-soluble polyether siloxane surfactant (DOW 163 produced by DOW Chemical Company) are mixed thoroughly. The mixture begins to expand in 10 to 25 seconds and slowly expands to 10 to 15 times its original volume within 30 to 120 seconds thereby producing a rigid poly(epoxy-polyisocyanate-silicate) foamed product.

EXAMPLE 6

About 75 parts by weight of propylene oxide, 75 parts by weight of an epoxide compound selected from the list below, 100 parts by weight of methylene-p-phenylene diisocyanate flakes, 10 parts by weight of polysilicic acid and 10 parts by weight of concentrated phosphoric acid are mixed. The mixture expands, then forms a foamed poly(epoxy-polyisocyanate-silicate) product.

| Example | Epoxide Compound |
|---|---|
| a | trichlorobutylene oxide |
| b | butylene oxide |
| c | epichlorohydrin |
| d | methyl epichlorohydrin |
| e | tetrahydrofuran |
| f | styrene oxide |
| g | 3,4-epoxycyclohexylmethyl-3,4-epoxycyclohexane |
| h | vinyl cyclohexane dioxide |
| i | 3,4-epoxy-6-methylcyclohexylmethyl adipate |
| j | epoxidized soy bean oil |
| k | di(2,3-epoxybutyl) adipate |
| l | 2,3-epoxybutyl |

EXAMPLE 7

About 100 parts by weight of polyphenylpolymethylene-polyisocyanate with an NCO content of about 31%, 10 parts by weight of concentrated phosphoric acid, 0.5 parts by weight of BF$_3$, 30 parts by weight of powdered silica sol and 1 part by weight of a silicone surfactant (DOW 163 produced by DOW Corning) are added to an autoclave with an agitator and large enough to allow room for expansion, at room temperature, then 100 parts by weight of ethylene oxide are added under pressure wherein the ethylene oxide is added in a liquid form; the autoclave is cooled to prevent excess heat; the mix begins to expand in 10 to 20 seconds and is poured out into a mold thereby producing a semi-rigid foamed product.

EXAMPLE 8

Example 7 is modified wherein 25 parts by weight of propylene oxide are added at the same time that the ethylene oxide is added.

EXAMPLE 9

Example 7 is modified wherein 25 parts by weight of tolylene diisocyanate is added with the polyphenyl-polymethylene-polyisocyanate.

EXAMPLE 10

About 100 parts by weight of propylene oxide, 5 parts by weight of concentrated phosphoric acid, 1 part by weight of a silicone surfactant (L5340 produced by Air Products), 20 parts by weight of polysilicic acid and 75 parts by weight of a compound containing at least two isocyanate radicals selected from the list below are mixed thoroughly. The mixture expands in 10 to 20 seconds to produce a poly(epoxy-polyisocyanate-silicate) foamed product.

| Example | Polyisocyanate |
|---|---|
| a | tolylene diisocyanate; |
| b | hexylene-1,6 diisocyanate; |
| c | equal parts by weight of tolylene diisocyanate and polyphenylpolymethylene-isocyanate; |
| d | toluene diisocyanate reacted with polypropylene glycol (mol. wt. 500) in an NCO/OH ratio of 25:1; |
| e | diisocyanatediphenylmethane reacted with a tetrafunctional polypropylene glycol (mol. wt. 500) to produce a prepolymer having about 22% NCO group; |
| f | methylene bis-phenyl diisocyanate reacted with a liquid polyepichlorohydrin polyol to produce a prepolymer of about 16% NCO groups and the mixture containing 25% by weight of a resin extender, polyalpha-methyl styrene, percentage based on weight of prepolymer; |
| g | polyphenylpolymethylene-isocyanate reacted with polyethylene oxide monohydric alcohol (mol. wt. 1100) initiated on trimethylol propane to produce a prepolymer with an NCO content of about 15%; |
| h | residue of tolylene diisocyanate distillation containing about 20% NCO by weight reacted with polyethylene glycol (mol. wt. 1500) to produce a prepolymer with an NCO content of about 10%; |
| i | tolylene diisocyanate reacted with a liquid hydroxyl-terminated polybutadiene (mol. wt. 500) to produce a prepolymer with an NCO content of about 10%; |

-continued

| Example | Polyisocyanate |
|---|---|
| j | tolylene diisocyanate reacted with a polyester (4 mols of glycerol, 2.5 mols of adipic acid and 0.5 mol. of phthalic anhydride) to produce a prepolymer with an NCO content of about 20%; |
| k | 4,4-diphenylmethane diisocyanate (MDI); |
| l | 4,4-diphenylmethane diisocyanate reacted with acetic acid to produce a prepolymer with an NCO content of about 28%; |
| m | 5 mols. of 4,4'-diphenylmethane diisocyanate reacted with 1 mol. of tripropylene glycol to produce a prepolymer with an NCO content of 23% by weight. |

EXAMPLE 11

Example 10 is modified wherein 6N sulfuric acid is utilized in place of phosphoric acid.

EXAMPLE 12

Example 10 is modified wherein concentrate hydrochloric acid is utilized in place of phosphoric acid.

EXAMPLE 13

Example 10 is modified wherein 10 parts by weight of trichlorotrifluoroethane are added with the polyisocyanate.

EXAMPLE 14

Example 10 is modified wherein 50 parts by weight of a filler, expanded glass is added with the components.

Other fillers may be used in place of expanded glass such as gypsum, chalk, hollow beads of plastics, carbon black, glass fibers, sand, basalt powder, molybdenum sulphite, steel wool and other fillers.

EXAMPLE 15

Example 1 is modified by adding 15 parts by weight of sodium hydroxide flakes to the reacting mixture of components (a), (b) and (d) while still in a fluid state thereby producing a thick liquid poly(epoxy-polyisocyanatesilicate) polymer.

Other alkali compounds such as alkali metal compounds, e.g., sodium carbonate, alkaline metal earth compounds, e.g., calcium hydroxide, calcium carbonate, and mixtures thereof may be used in place of sodium hydroxide.

EXAMPLE 16

About 100 parts by weight of polyphenylpolymethylene-polyisocyanate with an NCO content of 31% by weight, 1 part by weight of propylene oxide, 5 parts by weight of powdered hydrated silica and 0.5 parts by weight of concentrated phosphoric acid are mixed; the components react within 10 to 120 minutes thereby producing a poly(epoxy-polyisocyanate-silicate) prepolymer with free NCO groups.

EXAMPLE 17

About 100 parts by weight of the poly(epoxy-polyisocyanate-silicate) prepolymer produced in Example 16, 0.5 part by weight triethylenediamine, 0.5 part by weight of silicone surfactant (DOW 163 produced by Dow Chemical Co.), 5 parts by weight of trichlorofluoromethane, 1 part by weight of sodium doctyl sulfosuccinate and 50 parts by weight of aqueous sodium silicate solution containing 40% sodium silicate with a NaO/SiO$_2$ ratio of 1:2 are mixed thereby producing a rigid foamed product.

EXAMPLE 18

About 100 parts by weight of polyphenylpolymethylene-polyisocyanate with an NCO content of about 31% by weight, 5 parts by weight of epichlorohydrin, 5 parts by weight of powdered polysilicic acid and 1 part by weight of concentrated phosphoric acid are mixed and allowed to react at ambient temperature and pressure for 2 hours thereby producing a liquid poly(epoxy-polyisocyanate-silicate) prepolymer with free NCO groups.

EXAMPLE 19

About 100 parts by weight of the poly(epoxy-polyisocyanate-silicate) prepolymer are produced in Example 18, 100 parts by weight of Portland cement, 100 parts by weight of sand, 15 parts by weight of water, 0.5 parts by weight of triethylamine, 0.2 parts by weight of tin oxalate and 15 parts by weight of trichlorotrifluoroethane are mixed, the mixture expands 4 to 10 times its original volume to produce a rigid foamed product.

Although specific conditions and ingredients have been described in conjunction with the above examples of preferred embodiments, these may be varied and other reagents and additives may be used where suitable, as described above, with similar results.

Other modifications and applications of this invention will occur to those skilled in the art upon reading this disclosure. These are intended to be included within the scope of this invention, as defined in the appended claims.

I claim:

1. The process for the production of foamed poly(epoxide-polyisocyanate-silicate) product by mixing and reacting the following components:
   (a) an organic mono-or polyepoxide compound, 1 to 200 parts by weight;
   (b) an organic compound containing at least 2 isocyanate groups, 50 to 100 parts by weight;
   (c) a Lewis acid, up to 20% by weight, percentage based on weight of components (a) and (b);
   (d) an oxidated silicon compound, 1 to 50 parts by weight.

2. The product produced by the process of claim 1.

3. The process of claim 1 wherein the organic monoepoxide compound is selected from the group consisting of olefin epoxides, epihalohydrin, styrene oxide, tetrahydrofuran and mixtures thereof.

4. The process of claim 1 wherein the organic compound containing at least 2 isocyanate radicals is selected from the group consisting of aliphatic, cycloaliphatic, araliphatic, aromatic and heterocyclic polyisocyanates and mixtures thereof.

5. The process of claim 1 wherein the organic compound containing at least 2 isocyanate radicals is selected from the group consisting of tolylene diisocyanate, phosgenated product of aniline-aldehyde condensation, phosgenated product of aniline-aldehyde condensation, phosgenated product of aniline-ketone condensation, isocyanate-terminated polyurethane prepolymer and mixtures thereof.

6. The process of claim 1 wherein the Lewis acid is selected from the group consisting of mineral acids, metal halides, alkali metal hydrogen salts.

7. The process of claim 1 and mixtures thereof wherein the Lewis acid is phosphoric acid.

8. The process of claim 1 wherein the mono-organic epoxide compound is selected from the group consisting of ethylene oxide, propylene oxide, epichlorohydrin, styrene oxide, tetrahydrofuran and mixtures thereof.

9. The process of claim 1 wherein the oxidated silicon compound is selected from the group consisting of polysilicic acid, hydrated silica, silicoformic acid and mixtures thereof.

10. The process of claim 1 wherein a polyepoxy compound is selected from the group consisting of aliphatic diepoxides, cycloaliphatic diepoxides, polyalkylene ether glycol bisepoxides, epoxided vegetable oils and mixtures thereof, said epoxy compounds having no reactive hydroxyl groups attached thereto is added with component (a) in an amount wherein up to 90% of the organic mono-epoxide is replaced with a polyepoxy compound.

11. The process of claim 1 wherein up to 50% by weight of a chemically inert blowing agent, boiling within the range of from −25° C. to 80° C. is added with Components (a), (b), (c) or (d).

12. The process of claim 1 wherein up to 200% by weight of a curing agent is added to the reacted mixture of components (a), (b), (c), and (d) while the mixture is still in a fluid state.

13. The process of claim 1 wherein up to 10% by weight of a polyisocyanate activator is added to the reacted mixture of components (a), (b), (c) and (d) while the mixture is still in a fluid state.

14. The process of claim 1 wherein up to 20% by weight of a foam stabilizer is added to components (a), (b), (c) or (d).

15. The process of claim 1 wherein up to 20% by weight of an emulsifying agent is added to components (a), (b), (c) or (d).

16. The process of claim 1 wherein an alkali compound selected from the group consisting of alkali metal compound, alkaline earth metal compound, and mixtures thereof is added to the reacting mixture of components (a), (b), (c) and (d) while still in a fluid state, in an amount wherein the alkali radicals are about equal to the Lewis acid radicals.

17. The product produced by the process of claim 10.

18. The product produced by the process of claim 12.

19. The product produced by the process of claim 16.

20. The process of claim 1 wherein an inert inorganic or organic particulate or fibrous filler material is added to the mixture of Components (a), (b), (c) and (d).

* * * * *